United States Patent [19]

Kimura et al.

[11] Patent Number: 4,886,572
[45] Date of Patent: Dec. 12, 1989

[54] COMPOSITE ELECTRODE COMPRISING A BONDED BODY OF ALUMINUM AND ELECTROCONDUCTIVE POLYMER AND ELECTRIC CELL USING SUCH A COMPOSITE ELECTRODE

[75] Inventors: Okitoshi Kimura, Tokyo; Toshiyuki Kabata, Yokohama; Toshiyuki Ohsawa, Kawasaki, all of Japan

[73] Assignee: Ricoh Company, Ltd., Tokyo, Japan

[21] Appl. No.: 283,605

[22] Filed: Dec. 13, 1988

[30] Foreign Application Priority Data

Dec. 14, 1987 [JP] Japan .................... 62-314165
Apr. 7, 1988 [JP] Japan .................... 63-83971
Nov. 28, 1988 [JP] Japan .................... 63-298253

[51] Int. Cl.$^4$ .................... C23F 1/00; B44C 1/22; B23H 3/00; C25B 9/00
[52] U.S. Cl. .................... 156/633; 156/647; 156/656; 156/665; 204/33; 204/129.1; 204/242; 204/290 R; 428/156; 428/457; 428/612; 428/624
[58] Field of Search ............... 156/629, 633, 647, 656, 156/665; 204/2.1, 33, 129.1, 242, 267, 280, 290 R, 290 F, 293; 428/600, 612, 613, 624, 626, 156, 457, 461; 427/307, 309

[56] References Cited

U.S. PATENT DOCUMENTS 3,249,523  5/1966  Post et al. .................... 156/665 X
3,316,133  4/1967  Shiru et al. .................... 156/665
4,481,052  11/1984  Buchta et al. .................... 204/290 R
4,765,874  8/1988  Modes et al. .................... 204/290 R

FOREIGN PATENT DOCUMENTS

183053A2  6/1986  European Pat. Off. .
WO08210  10/1988  Japan .

OTHER PUBLICATIONS

Vorlesungsskript, "Oberflachaneigenschaften", von Prof. Dr. H. G. Feller, T U Berlin, (1975), pp. 10, 11, 28, 129 and 138, JP-Abstr. 62096 525-A .

*Primary Examiner*—William A. Powell
*Attorney, Agent, or Firm*—Cooper & Dunham

[57] ABSTRACT

A bonded body of aluminum and electroconductive polymer, said aluminum having a surface to which said polymer is bonded, and mainly having (HOO) face (H=1,2,4) as a crystal face at said surface.

13 Claims, 2 Drawing Sheets

COMPOSITE ELECTRODE COMPRISING A BONDED BODY OF ALUMINUM AND ELECTROCONDUCTIVE POLYMER AND ELECTRIC CELL USING SUCH A COMPOSITE ELECTRODE

BACKGROUND OF THE INVENTION:

The present invention concerns a composite electrode comprising a bonded body of a conductor such as aluminum and an electroconductive polymer such as a polyaniline, as well as an electric cell using such a composite electrode.

A method of synthesizing an organic polymer by electrolytically oxidizing organic material has been known long since and various polymers have been developed by electrochemically controlling the synthesis of organic polymers.

Particularly, it has been known that polymers obtained by polymerization under electrolytic oxidation such as polypyrrole, polythiophene, polyphenylene, and polyaniline (Polypyrrole in A. F. Dinz, J. Chem. Soc., Chem. Commun., 1975, 635; Polythiophene in Japanese Patent Laid-Open No. 56-47421; Polyphenylene in Electrochem., Acta. 27, 61 (1982); Polyaniline in F. Diaz. J. Electroanal. Chem. 111, 1524 (1980)) have electroconductivities that can range from values corresponding to those of insulators or semiconductors up to those of metals, with the higher conductivities being attainable by doping such polymers with certain impurities. It has also been known that the doping is reversible and accompanies color change. Accordingly, vigorous studies have been made of applications or uses in display elements, photoelectronic conversion elements, switching elements, electrode materials, secondary cells, electromagnetic shielding materials and various kind of sensors.

It is customary to use such polymeric materials in a composite structure, i.e., in combination with other conductors (mainly metals), and aluminum is preferred as the conductor that can be used without impairing the advantageous properties of the polymeric material (reduced weight, thin film-like shape, etc.). Since aluminum is relatively light in weight and excellent in ductility as compared with other metals (Fe, Ni, Cu, etc.) it has been applied generally to those devices and composite materials intending for the reduction of weight and thickness. In addition, they have also been utilized frequently in electrolytic capacitors because of easy formation of oxide films and easy etching, as well as in the fabrication of conductive layers or reflective layers by means of Schottky junction using a gas phase method such as vapor deposition onto various kinds of materials.

The composite body comprising aluminum and polymer has been proposed for various aspects as functional electrodes. The present inventors have heretofore considered that it is preferable to apply electrolytic etching to aluminum production of for composite electrodes comprising a bonded body of aluminum and polymer, in order to obtain close bondability between aluminum and polymer, improvement in the charge collecting efficiency from the polymer and easy removal of oxide layers of aluminum (Japanese Patent Laid-Open No. 61-133,557). However, when electrolytic etching is applied to usual aluminum, although the surface area of the aluminum is increased and the close bondability between aluminum and polymer is improved, it involves a drawback that the mechanical strength of the aluminum is markedly reduced.

In use of a composite electrode comprising the bonded body of aluminum and polymer as a functional electrode in various devices, however ensuring the mechanical strength thereof is one of the items required from the view point of the manufacturing operation and also from the functional view point.

SUMMARY OF THE INVENTION

A first object of the present invention is to provide a bonded body of aluminum and electroconductive polymer improved in the close bondability and the impedance at the boundary, which can be applied as a composite electrode for various uses.

A second object of the present invention is to provide a secondary electric cell having high capacity and high energy density and excellent in the stability for repeating charge and discharge.

The first object of the present invention can be achieved by a bonded body of aluminum and electroconductive polymer, said aluminum mainly having (H00) face (H=1,2,4) as a crystal face at a bonded surface, and the second object of the present invention can be achieved by a secondary electric cell comprising an electrode of such a bonded body.

With the bonded body of the present invention, it is possible to obtain a bonded body in which the close bondability at the boundary is improved, the boundary impedance is improved and the film thickness of the electroconductive polymer is uniform, and which can be employed as a composite electrode for various kinds of elements. The electric cell according to the present invention using such a composite electrode has high capacitance and high energy density and is excellent in the stability for repeating charge and discharge.

The present invention is based on the discovery that a satisfactory bonded surface can be obtained in the bonding of aluminum and electroconductive polymer, particularly, in the bonding of aluminum mainly having (H00) face (H=1,2,4) as the crystal face at the bonded surface.

Metals having a crystal structure of the face centered cubic lattice type such as aluminum or alkali metals have high reactivity at (H00) faces and, in the case of bonding by the chemical method, it is possible to provide satisfactory close bondability. Particularly, in the case of preparing an electroconductive polymer on aluminum as a substrate, this effect is remarkably developed as compared with the aluminum not mainly having (H00) face (H=1,2,4) as the crystal face at the bonded surface. This makes the boundary impedance between aluminum and polymer lower to provide an advantage for the use of the bonded body of aluminum and polymer in various devices.

Accordingly, the present invention provides a bonded body of aluminum and electroconductive polymer in which the aluminum at the bonded surface has mainly (H00) face (H=1,2,4) as the crystal face, and also a method of manufacturing such a body, as well as an electric cell using such a bonded body as an electrode.

The polymer usable for the bonded body in the present invention is a polymer which includes a conjugated double bond in the main chain and/or a hetero atom in the main chain and which is active for electrochemical oxidation and reduction where such a action is reversible, such as;

(a) a heterocyclic 5-membered ring compound polymer comprising furan, pyrrole, thiophene, selenophene, telluphene, etc. and derivatives of those as the monomer, (b) polymer of aromatic hydrocarbon compounds comprising benzene, naphthalene, anthracene, pyrene, fluorene, azulene, etc. and derivatives of those as the monomer and (c) polymer of amine compounds comprising aniline, p-aminodiphenylamine, N,N'-diphenyl benzidine, etc. and derivatives of those as the monomer.

For the method of polymerizing such monomers, there can be used a chemical polymerization using an oxidizing agent and electrolytic polymerization utilizing electric energy.

The chemical polymerization is conducted by adding an oxidizing agent into a solution containing a monomer and oxidizing the monomer. The oxidizing agent usable herein includes halogen such as iodine, bromine, bromoiodide; metal halide such as arsenic pentafluoride, antimony pentafluoride, silicon fluoride and phosphorus pentachloride; protonic acid such as sulfuric acid, nitric acid, fluorosulfuric acid, chlorosulfuric acid; oxygen-containing compound such as sulfur trioxide, nitrogen dioxide, potassium permanganate or potassium hydrogen chromate; persulfate such as sodium persulfate, potassium persulfate and ammonium persulfate; peroxide such as hydrogen peroxide, peracetic acid and difluorosulfonyl peroxide.

In the chemical polymerization, when a polymer of high polymerization degree is synthesized, the polymer is insoluble and synthesized into a powdery form. In view of the above, for practicing the production of the bonded body according to the present invention, it is necessary to closely bond aluminum and the polymer mechanically, but this method involves a drawback that the close bondability between aluminum and polymer is poor and the boundary impedance increases.

On the other hand, in the electrolytic polymerization utilizing electrochemical reaction, since the bonded body of aluminum and polymer can be produced substantially in one step by using aluminum as the reaction electrode and the boundary impedance can be lowered, it is used more preferably to the polymerization method using the oxidizing agent. However, it is difficult to conduct electrolytic polymerization of the monomer directly to aluminum and uniform formation of a polymer has generally been difficult.

As a method of electrolytically polymerizing the monomer directly onto aluminum, the present inventors have heretofore found that electrolytic polymerization of the monomer directly to the aluminum substrate is possible by applying mechanical polishing with emery paper to the surface of an aluminum electrode and an electrolytic etching with a purpose of removing thick oxide films on the surface to some extent. The present inventors have made a further study and, as a result, have found that when aluminum mainly having the (H00) face (H=1,2,4) as the crystal face at the surface is used, the monomer is uniformly polymerized onto the aluminum surface without applying the etching operation to the aluminum surface.

The electrolytic polymerization method conducted by using aluminum as an electrode is described generally in, for example, J. Electrochem. Soc., Vol. 130, No. 7, 1506-1509 (1983), Electrochem. Acta., Vol. 27, No. 1, 61-65 (1982), J. Chem. Soc. Chem. Commun., 1199 - (1984), etc., and the method can be practiced by placing a solution containing a monomer and an electrolyte dissolved in a solvent into a predetermined electrolysis vessel, immersing an electrode and causing electrolytic polymerizing reaction by means of anodic oxidization or cathodic reduction.

As the electrolyte, there can b mentioned, for example, $BF_4^-$, $AsF_6^-$, $SbF_6^-$, $PF_6^-$, $ClO_4^-$, $HSO_4^{2-}$ and aromatic sulfonic acid anions as the anion, while $H^+$, quarternary ammonium cation, lithium, sodium or potassium, etc. are examples of suitable cations, with no particular restriction only thereto.

Further, the solvent can include, for example, water, acetonitrile, benzonitrile, propylene carbonate, Y-butyrolactone, dichloromethane, dioxane, dimethylformamide or nitro type solvent such as nitromethane, nitroethane, nitropropane, nitrobenzene, etc., with no particular restrictions only thereto. For the electrolytic polymerization, a constant voltage electrolysis, constant current electrolysis, and constant potential electrolysis may be used.

As the electroconductive polymer usable in the present invention, there can be mentioned those polymers comprising the monomers described above which can be applied with doping and de-doping repeatedly and they can include, for example, polypyrrole, polythiphene, poly-3-methylthiophene, methylthiophene, polyphenylene, polyaniline, diphenyl benzidine polymer and derivative thereof, those having electroconductivity, at the doped state, of greater than $10^{-3}$ S/cm being preferred.

As the electroconductive polymer used in the present invention, there can be mentioned those described above and polyaniline having excellent chemical stability is preferred.

Aniline and substituted polyaniline used in the present invention are polymers of the monomers represented by the following general formula:

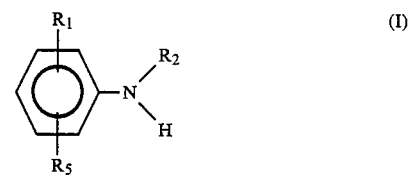 (I)

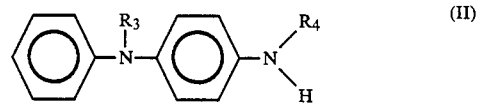 (II)

wherein $R_1$-$R_5$ represent hydrogen, alkyl, alkoxy and silyl providing that $R_2$, $R_3$ and $R_4$ are not alkoxy.

Specifically, there can be mentioned aniline, 4-aminodiphenylamine, N-methylaniline, N-ethylaniline, 4-(N-methylamino)diphenylamine, diphenylamine, o-methylaniline, o-ethyl-aniline, m-methylaniline, m-ethylaniline, 4-(N-ethylamino)diphenylamine, N,N'-diphenyl-p-phenylenediamine, N-trimethylsilylaniline, o-trimethylsilylaniline, m-trimethylsilylaniline, o-methoxyaniline, o-ethoxyaniline, m-methoxyaniline, m-ethoxyaniline, 2,5-dimethylaniline, 2,6-dimethylaniline, 2,5-dimethoxyaniline, 2,6-dimethoxyaniline, etc. Among them, aniline has preferred property in view of the electrode characteristics for use in electric cells.

Upon electrolytic synthesis of polyaniline, it is synthesized in an aqueous acidic solution containing aniline and using protonic acid such as $H_2SO_4$, HCl, $HClO_4$, $HBF_4$, etc. as the electrolyte, different from the synthesis of many other electroconductive polymeric materials conducted in a non-aqueous system (Japanese Patent Application Laid-Open No. 62-96525, J. Electroanal. Chem. 161, 419 (1984)). In the direct electrolytic synthesis of polyaniline on aluminum, the effect according to the present invention is developed markedly. It can be observed for instance, in the polymerization of aniline onto aluminum in an aqueous sulfuric acid solution, a thin film of polyaniline is uniformly grown on the surface of aluminum when using aluminum having the (H00) faces (H=1,2,4) as the main crystal face at the surface as the electrode and applying electric field, whereas polymerization does not substantially occur or the polymer is grown only in an island-like configuration on the aluminum surface, if the polymerization occurs, failing to cause uniform polymerization when applying electric field using aluminum not having the (H00) face (H=1,2,4) as the main crystal face at the surface as the electrode. The phenomenon is also similar to the synthesis of other electroconductive polymeric materials on aluminum, not restricted only to the polymerization of aniline, but it is particularly remarkable phenomenon in the synthesis of polyaniline. Further, if the surface of aluminum having the (H00) face (H=1, 2, 4) as the main crystal face at the surface is roughened with emery paper, etc. to disturb the crystal arrangement of the (H00) face (H=1,2,4), the growth of the polymer becomes extremely non uniform.

As another form of a production method for the bonded body according to the present invention, a process is considered in which aluminum mainly having the (H00) face (H=1,2,4) as the crystal face is applied with etching thereby making a bonded body with the electroconductive polymer. Also in this method, the direction of the crystal face of aluminum is extremely important. That is, it is preferred that the crystal face at the surface of aluminum to be applied with etching is mainly the (H00) face (H=1,2,4).

It is known that the crystal structure of aluminum is the face centered cubic lattice structure and there is a difference in the density of atoms on the resultant crystal faces depending on the arrangement of the atoms. Accordingly, it is considered that reactions such as oxidation or etching can proceed more rapidly in the less dense face (100) than other dense faces (110), (111), etc.

On the (100) crystal face of aluminum, there is a feature that micro unevenness of the aluminum surface formed by electrolytic etching is uniformly formed in the direction perpendicular to the aluminum surface (FIG. 1). Further, the unevenness is particularly deep at the (100) crystal face or penetration holes can be obtained. Since micro apertures are in communication with each other, there is less detaching of aluminum, and thus less reduction in the strength and less reduction in the specific surface area are caused, thereby causing less disadvantage. On the other hand, in aluminum of low crystallinity or aluminum containing a lot of (110) face, (111) face in the crystal face at the surface, formation of micro holes in the aluminum surface by the electrolytic etching does not proceed uniformly in the direction perpendicular to the aluminum surface and individual holes are formed being bent in respective directions (FIG. 2). Therefore, since the holes are in communication with each other in a complicated manner, disadvantages are caused remarkably such as detaching of aluminum, thus, reduction in the strength and reduction in the specific surface area.

As an embodiment of the present invention in the case of applying etching to aluminum, it may be considered to apply at first electrochemical etching to aluminum in an etching solution and then directly bond the electroconductive polymer to aluminum. In the case of the bonded body of aluminum and polyaniline according to the present invention, it is also possible to make the bonded body substantially in on step by electrochemically applying etching to aluminum in an etching solution using an acid capable of direct electrolytic polymerization of aniline onto aluminum while adding the aniline monomer to the solution as described later. In the case of this method, since the aniline polymerization is proceeded directly to the etched surface, there is an advantage that the bonding of aluminum and polyaniline is possible while suppressing the oxidation at the etched face to some extent.

As has been described above, aluminum used in the present invention has the (H00) face (H=1,2,4) as the main crystal face at the surface.

The (H00) face referred to in the present invention includes (100) face, (200) face and (400) face in the crystallographic meaning and the crystal structure is judged by X-ray diffractiometry to the aluminum surface. The X-ray diffraction pattern on the aluminum surface used in the present invention mainly comprises diffraction lines by the (200) face and, from a quantitative view point, the ratio of the integrated intensity of the diffraction lines by the (200) face to the integrated intensity of the total diffraction lines is greater than 0.4 and, preferably, greater than 0.6.

By the electron diffractiometry, the (H00) face (H=1,2,4) of the aluminum has a electron diffraction pattern of a spot-like shape which indicates high single crystallinity of the aluminum at the surface.

The aluminum mainly having (H00) face (H=1,2,4) as a crystal face at the surface used in the present invention can be produced by the zone-melting method (W.G. Pfann Trans A.I.M.E. 194,747 (1952)), for example. The zone-melting method can produce the aluminum mainly having the (H00) face as a crystal face at the surface and in the bulk as well. Such an aluminum can be applied to the present invention as it is, or after it is sliced so as to have the (H00) face at the surface.

As an embodiment of the present invention, whether electrolytic polymerization is conducted directly or the electrolytic polymerization is conducted after or during etching to aluminum mainly having the (H00) face as the crystal face at the surface, is selected depending on the application uses of the bonded body and cannot be determined simply.

However, it is generally possible to synthesize electroconductive polymer uniformly on aluminum by using the aluminum as described above according to the present invention. Then, in the application use, for example, as an electrochromic electrode, uniform color change accompanying the change of the electric field is possible. Further, in the application use to an electrode for a secondary cell, since the film is grown uniformly, it is possible to obtain an electrode of lower internal resistance as compared with the electrode grown into island-like shape and, accordingly, it is possible to improve the reduction of the energy capacity, etc. due to the lowering in the voltage.

The electrolytic polymerization for aniline is conducted in an acidic aqueous solution and the use of a specific acid is indispensable for synthesizing polyaniline on aluminum. Those acids having PKa value within a range from −2.5 to +2.5 provide satisfactory results.

Such an acid can include, for example, sulfuric acid, sulfonic acid such as paratoluene sulfonic acid, benzene sulfonic acid and naphthalene sulfonic acid, trifluoroacetic acid, etc. If perhydrochloric acid (PKa: about −3.1), tetrafluoroboric acid (PKa: about −4.9) or hydrochloric acid (PKa: about −4) is used, electrolyzing current for aluminum is observed at the polymerization potential of aniline and polymerization does not proceed. Further, if nitric acid (PKa: about −3) is used, although no electrifying current flows at the polymerization potential of aniline and aluminum is not leached, polyaniline is not formed. The similar phenomenon is also observed in the case of using hydrochloric acid (PKa: about 3.2) in which aniline polymerization does not proceed. It is considered that leaching or oxidization of aluminum has an effect on these phenomena and it is found as a result of the study that satisfactory results can be obtained by using an acid having PKa value within a range from −2.5 to +2.5.

In the case of conducting electrolytic polymerization using an acid incapable of direct polymerization of aniline to aluminum, such as HCl, HBF$_4$, etc., electrolytic polymerization is enabled by first forming a thin polyaniline film on aluminum by using an acid capable of direct polymerization such as H$_2$SO$_4$, etc. and, thereafter, conducting polymerization in HCl or HBF$_4$, or by first forming a thin film of polypyrrole, etc. on aluminum by chemical polymerization in advance.

As another embodiment of the bonded body according to the present invention, it is possible to apply such a method of first forming a thin film of polyaniline or other electroconductive polymer on aluminum using an acid capable of direct polymerization on aluminum such as H$_2$SO$_4$ and further depositing thereover electroconductive polymer such as polyaniline by using chemical polymerization. As a complex method using chemical polymerization, it is possible to put the bonded body of the thin polymeric film and aluminum together into a polymerization system containing protonic acid, oxidizing agent, water and aniline, or it is also possible to apply an electric field while using the bonded body of the thin polymeric film and aluminum as the reaction electrode in a nuclear chemical polymerization system thereby causing the polymerization of aniline onto aluminum to provide with the previously synthesized thin polymeric film as nuclei. In the latter method, it is possible to prepare the bonded body also under a low electric field less than the electric field necessary for polymerizing aniline in a system not containing the oxidizing agent, and it is also possible to deposit more polyaniline onto aluminum than in the system not containing the oxidizing agent.

The oxidizing agent usable in the chemical polymerization can include (NH$_4$)$_2$S$_2$O$_8$, FeCl$_3$, NaClO$_3$, MnO$_2$, H$_2$O$_2$, PbO$_2$, KMnO$_4$, K$_2$Cr$_2$O$_7$, etc. As the protonic acid, the same acids as those used for electrolytic polymerization of aniline can be used.

The potential applied to the electrode during electrolytic synthesis of polyaniline is preferably an electrolytic potential within a range from +0.75 to 0.95 V relative to the saturated calomel electrode (SCE).

If the potential is higher than +0.95 V, solubility to doping and de-doping in the electrolytic solution using PC, etc. is worsened to reduce the working life of the bonded body as the electrode. If it is lower than 0.75 V, although the solubility is not so deteriorated, development of fibrils of polyaniline is poor and, particularly, if it is lower than +0.7 V, the value of current flowing during polymerization is low to worsen the production efficiency.

The polymerization method is a constant potential electrolysis method, but constant current electrolysis may be employed so long as the potential difference between the reaction electrode (aluminum) and the reference electrode (SCE) is within a range between +0.75V and +0.95V.

In the bonded body prepared in the present invention, polymer is deposited on aluminum along with doping of ions. Accordingly, the bonded body prepared by the electrolytic polymerization is formed while being kept at a doped state. For removing the dopant from the bonded body, there can be employed a method of conducting electrochemical de-doping reaction by applying a potential sufficiently less noble to release ions from the polymeric ion complex in the electrolyte, or by applying chemical de-doping using reductive medium.

In the electrochemical method, it is preferred that the electrolyte is a non-aqueous electrolyte. If the de-doping operation is conducted for the bonded body in an aqueous electrolyte, there is a worry that the bonded body shows a mixed electrode potential of aluminum and electroconductive polymer, failing to effect sufficient reduction of the electroconductive polymer. Particularly, in the bonded body of aluminum and polyaniline, since aniline is electrolytically polymerized in the aqueous acidic solution, if the de-doping operation is conducted also in the aqueous acidic solution, the bonded body shows such a potential as considered to be the mixed electrode potential of aluminum and polyaniline making it impossible to conduct de-doping operation.

Accordingly, de-doping operation from the bonded body according to the present invention is preferably conducted in a non-aqueous solution. As for the polyaniline used in the present invention, there is a great difference in the chemical structure between the synthesized state (doped state) and the de-doped state because the synthesis is conducted in the aqueous acidic solution and unpaired electrons are present on nitrogen atoms. In the case of operating polyaniline, for example, as an electrochromic element, it is possible to cause color change by the potential sweeping even if the bonded body of aluminum and polyaniline in the synthesized state in the present invention is directly brought into a non-aqueous solution. In the case of application use of the bonded body of aluminum and polyaniline as an electrode for non-aqueous cell, if the cell performance is evaluated for the polyaniline synthesized by the electrolytic polymerization directly in the non-aqueous electrolyte without de-doping, the cell performance is somewhat deteriorated and more unstable as compared with the case of applying de-doping operation. This is considered to be due to the difference of the chemical structure of polyaniline between the synthesized state (doped state) and the reduced state described above. Thus, in the case of expecting a stable cell performance to polyaniline, it is necessary to apply de-doping operation to the polyaniline in the synthesized state bonded on aluminum by direct electrolytic polymerization and then place it into the non-aqueous electrolyte. However, as has been described above, the aluminum-polyaniline electrode shows the mixed electrode potential of polyaniline and aluminum in an aqueous acidic solution thus making it impossible to apply de-doping operation to polyaniline.

In order to eliminate such disadvantages, the present inventors have studied various reduction methods for the bonded body of aluminum and polyaniline and have succeeded in obtaining the bonded body of aluminum and polyaniline in the reduced state by chemically reducing the polyaniline in the synthesized state (doped state) in the bonded body (1) through contact with a reducing medium other than metals thereby conducting chemical reduction and/or (2) through contact with a reductive metal. The reduction method in the present invention is particularly effective in the bonded body of polyaniline and aluminum although also effective for the bonded body of other electroconductive polymer and aluminum.

As the reductive medium in the method (1), a reducing agent such as $H_2$, hydrazine, phenylhydrazine, etc. is used. Use of ammonia is not preferred and, if ammonia is used, the solubility of polyaniline in an organic solvent is increased to remarkably deteriorate the repeating doping/de-doping property of the bonded body. As the specific reduction method, the reducing agent described above may directly be brought into contact with the bonded body or may be dissolved in the other solvent, in which the bonded body may be immersed. The concentration of the solution is preferably from 20 to 70 vol %. Among them, a method of immersing the bonded body of aluminum and polyaniline into 30–60 vol % hydrazine solution is preferably adopted. As for the reducing treatment of polyaniline, Japanese patent Laid-Open No. 62-149724 describes applying a reducing treatment to polyaniline by means of hydrazine, etc. In this reference, it has been stated that a method of applying electrochemical doping operation to polyaniline in synthesized (doped state) in an aqueous acidic solution, applying reducing treatment with hydrazine and further applying alcohol treatment is most preferably employed. However, as has been described above, in the bonded body of aluminum and polyaniline according to the present invention, the de-doping operation is not applied in the aqueous acidic solution. If a less noble potential should be applied for applying de-doping to the bonded body of aluminum and polyaniline in the aqueous acidic solution, there occurs such disadvantages is that the solubility of the polyaniline in the non-aqueous solution is increased, the bonded body of aluminum and polyaniline is degraded at the bonded surface, etc. Accordingly, application of electrochemical de-doping in combination with the chemical reduction to the aluminum-polyaniline electrode according to the present invention as a step in the reduction of the polyaniline is not suitable. In this regard, the concept of the present invention is different from the feature of such related inventions. As another reduction method for the bonded body of aluminum and polyaniline, there can be mentioned a reduction method in contact with a reductive metal. The reductive metal includes specifically those alkali metals such as Li, Na, K, Mg, Ca, etc. In this method, de-doping of the polyaniline can be attained by a simple procedure of bringing the polyaniline prepared by the electrolytic polymerization and a reductive metal directly in a non-aqueous solvent or solution. Considering the procedure from an electrochemical point of view, it seems to correspond to the application of the standard electrode potential of an alkali metal to the polyaniline in the synthesized state (doped state). However, since the performance of the bonded body of aluminum and polyaniline as the cell electrode prepared by applying de-doping to the bonded body of aluminum and polyaniline according to the present invention by means of three electrode method using the bonded body as an operation electrode in a non-aqueous solution is inferior to that of the polyaniline applied with de-doping in contact with the alkali metal, it may be considered that a certain factor other than the potential is present in the reducing method for the polyaniline in the present invention, but no exact reason therefor has not yet been apparent.

There have been considered various kinds of devices a the application use of the bonded body according to the present invention. In case the doping and de-doping behavior of the electroconductive polymer is utilized, the bonded body has to be used in a non-aqueous solvent or with a solid electrolyte, because the de-doping behavior of the electroconductive polymer of the bonded body according to the present invention can not be conducted smoothly in an aqueous solution as has been described above.

Explanation is to be made for an electric cell using the bonded body of aluminum and electroconductive polymer according to the present invention as an electrode.

The electric cell according to the present invention basically comprises a positive electrode, a negative electrode and an electrolyte, in which a separator may be disposed between the electrodes. The electrolyte is constituted with a solvent and an electrolyte for which solid electrolyte may also be used.

The electric cell according to the present invention stores energy by being doped with anions or cations and releases energy through an external circuit upon de-doping. Further, in the electric cell according to the present invention, since doping/de-doping is conducted reversibly, it can be used also as a secondary cell.

In the present invention, the bonded body of aluminum and electroconductive polymer according to the present invention is used at least for the positive electrode.

As the dopant for the polymer of the electrode, there can be mentioned, for example, the following anions or cations, and cation-doped electroconductive polymeric complex provides n-type material, while anion-doped electroconductive polymeric complex provides p-type material. The p-type material can be used for the positive electrode and the n-type material can be used for the negative electrode. Since the polyaniline is also formed into a stable p-type material by the anion doping, it is suitable to the positive electrode.

(1) Anion: anions of halides of Va group elements such as $PF_6^-$, $SbF_6^-$, $AsF_6^-$ and $SbCl_6^-$; anions of halides of IIIa group elements such as $BF_4^-$; perchlorate anions such as $ClO_4$.

(2) Cation: ions of alkali metals such as $Li^+$, $Na^-$, $K^+$, $(R_4N)^+$ (where R: hydrocarbon group with 1 to 20 carbon atoms)

Specific examples of compounds giving the dopant described above can include, for example, $LiPF_6$, $LiSbF_6$, $LiAsF_6$, $LiClO_4$, $NaClO_4$, $KI$, $KPF_6$, $KSbF_6$, $KAsF_6$, $KClO_4$, $((n-Bu)_4N)^+AsF_6^-$, $((n-Bu)_4N)^+ClO_4^-$, $LiAlCl_4$, $LiBF_4$, etc., which are used as the electrolyte for the electric cell. Among them, $LiBF_4$, $LiSbF_6$, are preferred for the electric cell according to the present invention.

As the solvent for the electrolyte in the electric cell according to the present invention, those referred to as polar non-protonic solvents which are non-protonic solvents having a high specific dielectric constant are preferred. Specifically, there can be used, for example, ketones, nitriles, esters, ethers, carbonates, nitro compounds, sulfolan type compounds or mixtures of these solvents. Among them, nitrites, carbonates, and sulfolan type compounds are preferred. Typical examples of them can include, acetonitrile, propionitrile, butyronitrile, valeronitrile, benzonitrile, ethylene carbonate, propylene carbonate, $\gamma$-butyrolactone, sulfolan, 3-methylsulfolan, tetrahydrofuran, 2-methyltetrahydrofuran, etc. Specifically, those prepared based on propylene carbonate and by adding DME, sulfolan, THF or derivatives thereof have excellent performance. Further, polymers can be added to them into a paste-like form to improve the processability.

As the negative electrode in the electric cell according to the present invention, there can be used, in addition to the polymeric material described above, those metals and alloys such as Li, Zn, Cu, Ag, Al, binary alloy such as Al-Li, ternary alloy such as Li-Al-Ag or Li-Al-Mn or wood alloys. Among them, Li-Al alloy is preferred as the negative electrode in the electric cell according to the present invention and a ternary alloy such as Li-Al-Mg or Li-Al-Mn based on Li-Al is preferably used. To prepare the negative electrode of these metals and alloys, there are various cases; a metal itself may have both a function as the active substance and a charge collection function; or Ni, Al as the charge collecting material may be used in close bonding, or a charge collecting material may be used while supplying the active substance by the deposition of cations in the electrolyte.

As the separator in the electric cell according to the present invention, those materials showing low resistance to the ion movement in the electrolyte solution and excellent in the solution retainability are used. For instance, there can be used a glass fiber filter, a polymeric pore filter such as non-woven fabrics of polyester, teflon, polyflon, polypropylene, etc., or non-woven fabrics comprising glass fibers and such polymeric material.

Furthermore, solid electrolyte may also be used as the constituent element instead of the electrolyte and the separator. For example, there can be mentioned those inorganic electrolytes such as metal halide, for example, AgCl, AgBr, AgI and LiI, RbAg$_4$I$_5$, RbAg$_4$I$_4$CN, etc. As the organic solid electrolyte, there can be mentioned those composite materials prepared by using polyethylene oxide, polypropylene oxide, polyvinylidene fluoride or polyacrylonitrile as the polymer matrix, in which the electrolyte salt as described above is dissolved, crosslinking products thereof, and polymeric electrolyte prepared by grafting less ionizable groups such as low molecular weight polyethylene oxide, polyethylene imine, crown ether, etc. onto the polymer main chain.

DETAILED DESCRIPTION OF THE PREFERRED EMBODIMENT

Preferred embodiments of the present invention will be explained specifically while referring to the accompanying drawings.

EXAMPLE 1

Figure 1:
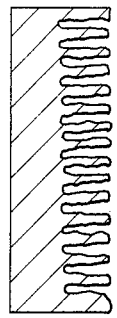
FIG. 1 is a schematic view for explaining the surface state in which electrolytic etching is applied to the aluminum mainly having the (H00) face as the crystal face at the surface used in the present invention.
Figure 2:
FIG. 2 is a schematic view for illustrating the surface state in which electrolytic etching is applied to conventional aluminum.
Figure 3:
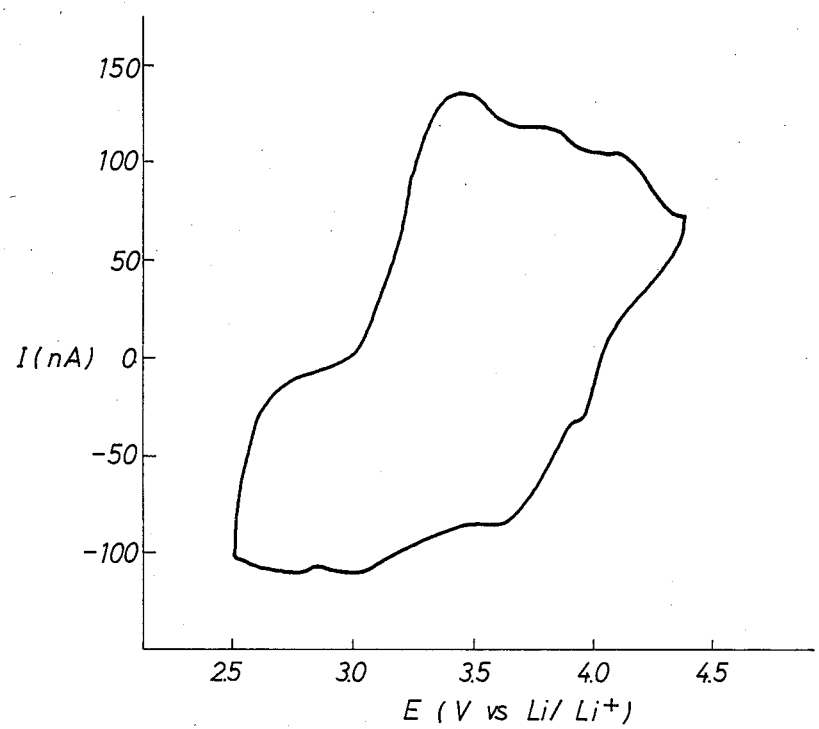
FIG. 3 is a graph showing the electrochemical property of the aluminum-polyaniline electrode (Example 1) according to the present invention.

Electrolytic polymerization is conducted for 0.5M aniline in an aqueous 5.0N sulfuric acid solution by using aluminum with 60 $\mu$m thickness (ratio of integrated intensity of diffraction lines by (200) face/integrated intensity of total diffraction lines=0.9) as the electrode for electrolysis at 0.8 V vs SCE, to obtain an aluminum-polyaniline electrode. In this case, aniline is uniformly polymerized on aluminum. As shown in FIG. 3, the aluminum-polyaniline electrode shows electrochemically repeating activity in a non-aqueous electrolyte (solution of 3.0M LiBF$_4$ in a mixed solvent of propylene carbonate and dimethoxyethane (7:3)), as shown in FIG. 3 and electrochromism is observed in accordance with the potential sweeping.

The aluminum-polyaniline electrode is then immersed in an aqueous 50 vol % hydrazine solution and dried. Then the cell test is conducted by repeating charge and is at a current density of 0.2 mA/cm$^2$ in an electrolyte of 3.0M LiBF$_4$ dissolved in a mixed solvent of propylene carbonate and dimethoxyethane (7:3) while using the aluminum-polyaniline electrode as the positive electrode and Li a the negative electrode.

| | Result | |
| --- | --- | --- |
| Charge/discharge | 10 times | 30 times |
| Open voltage | 3.7 V | 3.7 V |
| Coulomb efficiency | 100% | 100% |
| Energy density (per active substance) | 449 Wh/kg | 450 Wh/kg |
| Energy density (per positive electrode) | 116 Wh/kg | 116 Wh/kg |

EXAMPLE 2

An aluminum-polyaniline electrode is obtained in the same manner as in Example 1 except that the electrode is brought into contact with lithium in the electrolyte instead of being immersed in a hydrazine solution. Then, the same cell test as in Example 1 is conducted.

| | Result | |
| --- | --- | --- |
| Charge/discharge | 10 times | 30 times |
| Open voltage | 3.7 V | 3.7 V |
| Coulomb efficiency | 100% | 100% |
| Energy density (per active substance) | 448 Wh/kg | 448 Wh/kg |
| Energy density (per positive electrode) | 116 Wh/kg | 116 Wh/kg |

EXAMPLE 3

An aluminum-polyaniline electrode is obtained in the same manner as in Example 2 except that it is subjected to a reducing treatment by immersing it in an aqueous 50 vol % hydrazine solution after bring into contact with lithium. Then, the same cell test as in Example 1 is conducted.

| Result | | |
|---|---|---|
| Charge/discharge | 10 times | 30 times |
| Open voltage | 3.7 V | 3.7 V |
| Coulomb efficiency | 100% | 100% |
| Energy density (per active substance) | 450 Wh/kg | 450 Wh/kg |
| Energy density (per positive electrode) | 116 Wh/kg | 116 Wh/kg |

COMPARATIVE EXAMPLE 1

An aluminum-polyaniline electrode is obtained in the same manner as in Example 1 except that the aluminum used has a ratio of integrated intensity of diffraction lines by (200) face/integrated intensity of total diffraction lines=0.05, and is polished with CW1000 Emery paper. The film thickness of the polyaniline is not uniform and electrochromism caused by the potential sweeping does not show uniform color change. Then, the same cell test as in Example 1 is conducted.

| Result | | |
|---|---|---|
| Charge/discharge | 10 times | 30 times |
| Open voltage | 3.7 V | 3.6 V |
| Coulomb efficiency | 97% | 94% |
| Energy density (per active substance) | 429 Wh/kg | 404 Wh/kg |
| Energy density (per positive electrode) | 111 Wh/kg | 104 Wh/kg |

COMPARATIVE EXAMPLE 2

Aluminum-polyaniline electrode is obtained in the same manner as in Example 1 except that the hydrazine treatment is not applied. Then the same cell test as in Example 1 is conducted.

| Result | | |
|---|---|---|
| Charge/discharge | 10 times | 30 times |
| Open voltage | 3.6 V | 3.6 V |
| Coulomb efficiency | 100% | 98% |
| Energy density (per active substance) | 215 Wh/kg | 212 Wh/kg |
| Energy density (per positive electrode) | 56 Wh/kg | 55 Wh/kg |

COMPARATIVE EXAMPLE 3

Aniline polymerization is tried in the same manner as in Example 1 except that the aluminum used has a ratio of integrated intensity of diffraction lines by (200) face/integrated intensity of total diffraction lines=0.05. As a result, formation of the polymer is extremely non uniform.

COMPARATIVE EXAMPLE 4

Aniline polymerization is tried in the same manner as in Example 1 except that the aluminum used has a ratio of integrated intensity of diffraction lines by (200) face/integrated intensity of total diffraction lines=0.94, and is polished with CW100 Emery paper. As a result, formation of the polymer is extremely non uniform.

EXAMPLE 4

An acetonitrile solution containing 0.1 mol/l of pyrrole and 0.1 mol/l of tetraethylammonium paratoluene sulfonate is prepared in a reaction vessel made of glass under an Ar (argon) atmosphere. Electrolytic oxidative polymerization of pyrrole is conducted by using aluminum of 50 μm thickness (ratio of integrated intensity of diffraction lines by (200) face/integrated intensity of total diffraction lines=0.94) as an anode and nickel as a cathode and applying a constant voltage of 5 V between both of the electrodes. In this case, black polypyrrole is uniformly deposited on the aluminum. The dried weight of the electrode is 56.4 mg. Then, 0.75 V vs SCE potential is applied to make an electric charge amount of 5 C/cm$_2$ flowing in an aqueous solution of 0.5M aniline in 3N HBF$_4$ using the above prepared electrode as the operation electrode, platinum as the counter electrode and SCE as the reference electrode. The dried weight is 74.3 mg and aniline could be polymerized with no leaching of aluminum.

COMPARATIVE EXAMPLE 5

Electrolytic oxidative polymerization of pyrrole is conducted in the same manner as in Example 4 except that the aluminum used (of 50 μm thickness) has a ratio of integrated intensity of diffraction lines by (200) face/integrated intensity of total diffraction lines=0.05). In this case, deposition of pyrrole is extremely non uniform and the dried weight is 54.4 mg. Then, the aniline polymerization is conducted in the same manner as in Example 1 using the resultant electrode as the operation electrode. The dried weight of the electrode is 52.0 mg and it is considered that leaching of aluminum occurs preferentially because the pyrrole is not uniform.

EXAMPLE 5

Figure 4:
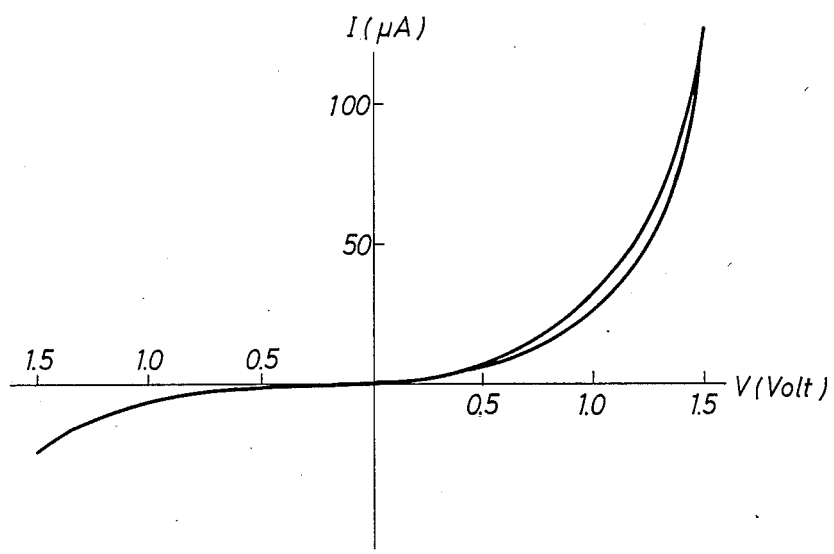
FIG. 4 is a graph showing the switching characteristics of aluminum/polyaniline/gold 3-layered device (Example 5) according to the present invention.

Gold is vapor deposited on the polyaniline of the aluminum-polyaniline electrode prepared in Example 1 and terminals are led out respectively to manufacture a three-layered aluminum/polyaniline/gold device. As a result of examining the current-voltage characteristics thereof, a switching characteristic as shown in FIG. 4 is observed.

EXAMPLE 6

An acetonitrile solution containing 4.5 mol/l of N,N'-diphenylbenzidine, 0.1 mol/l of tetrabutyl ammonium perchlorate and 0.05 mol/l of 2,6-lutidine is prepared in a reaction vessel made of glass. Polymerization is conducted by means of 3-electrode method using aluminum used for the anode in Example 1 as the operation electrode, platinum as the counter electrode and a saturated calomel electrode (SCE) as the reference electrode and by applying a voltage of 1.2 V vs SCE. In this case, black oxidized polymer is uniformly deposited on aluminum.

COMPARATIVE EXAMPLE 6

Polymerization is conducted in the same manner as in Example 6 except that the aluminum used has a ratio of integrated intensity of diffraction lines by (200) face/integrated intensity of total diffraction lines=0.05. Deposition of the polymer on aluminum is not uniform.

COMPARATIVE EXAMPLE 7

Polymerization is conducted in the same manner as in Example 6 except that the aluminum used has a ratio of integrated intensity of diffraction lines by (200) face/integrated intensity of total diffraction lines=0.94, and is polished with CW1000 Emery paper. Deposition of the polymer on aluminum is extremely non uniform.

EXAMPLE 7

A solution containing 5 ml of benzene, 70 ml of nitrobenzene, a saturated amount of $LiAsF_6$ and, further, saturated amount of cadmium sulfate is prepared in a reaction vessel made of glass under an Ar atmosphere. Electrolytic oxidative polymerization is conducted by using aluminum of 50 μm thickness (ratio of integrated intensity of diffraction lines by (200) face/integrated intensity of total diffraction line=0.65) as the anode and nickel as a cathode and applying a constant voltage of 15 V between both of the electrodes. In this case, black polyphenylene is uniformly deposited on the aluminum electrode.

COMPARATIVE EXAMPLE 8

Polymerization is conducted in the same manner as in Example 7 except that the aluminum used (of 50 μm thickness) has a ratio of integrated intensity of diffraction lines by (200) face/integrated intensity of total diffraction lines=0.28. Deposition of the polymer on aluminum is not uniform.

The cell test for the composite electrode in and after Example 8 is conducted after applying appropriate reducing treatment to the composite electrode.

EXAMPLE 8

Figure 5:
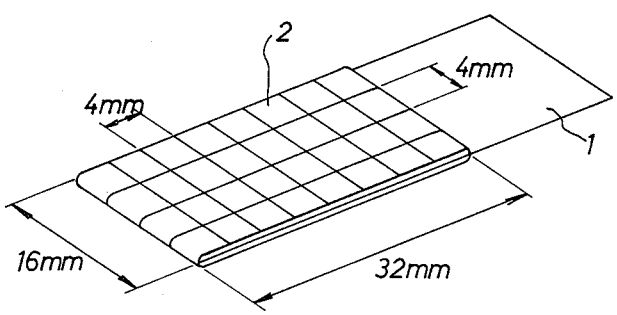
FIG. 5 is a view illustrating the peeling test.

An acetonitrile solution containing 0.1 mol/l of pyrrole and 0.1 mol/l of tetrabutylammonium perchlorate is prepared in a reaction vessel made of glass under an Ar atmosphere. Electrolytic oxidative polymerization is conducted by using aluminum applied with electrolytic etching of 50 μm thickness (integrated intensity of diffraction lines by (200) face/integrated intensity of total diffraction lines=0.94, and immersion area: 16×32 mm) as the anode and nickel as the cathode and applying a constant voltage of 5 V between both of the electrodes to make an electric charge amount of 1.0 $C/cm^2$ flowing in the solution. In this case, black polypyrrole is uniformly deposited on aluminum. After taking out the resultant composite electrode and washing, 4 mm×4 mm lattice-like lines are scored on one side of the composite electrode as shown in FIG. 5. A pressure sensitive adhesive tape is appended on the surface, which is peeled off at a rate of 60 mm/sec in the direction in parallel with the surface of the composite electrode to test the close bondability between aluminum 1 and the polymer 2 depending on the number of 4×4 mm lattice units that are peeled off. As a result, no peeled portions are observed.

COMPARATIVE EXAMPLE 9

The same procedures as in Example 8 are conducted except that the aluminum used (of 50 μm thickness) has a ratio of integrated intensity of diffraction lines by (200) face/integrated intensity of total diffraction lines=0.35. Peeling occurs at two portions.

EXAMPLE 9

A solution containing 5 ml of benzene, 10 ml of nitrobenzene, a saturated amount of $LiAsF_6$ and, further, a saturated amount of cadmium sulfate is prepared in a reaction vessel made of glass under Ar atmosphere. Electrolytic oxidative polymerization is conducted by using aluminum applied with electrolytic etching of 50 μm thickness (ratio of integrated intensity of diffraction lines by (200) face/integrated intensity of total diffraction lines=0.65) as the anode and nickel as the cathode, and applying constant voltage of 15 V between both of the electrodes to make an electric charge amount of 1.0 $c/cm_2$ flowing in the solution. In this case, black polyphenylene is deposited on the aluminum. When conducting the same peeling test as in Example 8, no peeling portions are observed.

COMPARATIVE EXAMPLE 10

The same procedures as in Example 9 are conducted except that the aluminum used (of 50 μm thickness) has a ratio of integrated intensity of diffraction lines by (200) face/integrated intensity of total diffraction lines=0.28. Peeling occurs at three portions.

EXAMPLE 10

An acetonitrile solution containing 4.5 mol/l of N,N'-diphenylbenzidine, 0.1 mol/l of tetrabutyl ammonium perchlorate and 0.05 mol/l of 2,6-lutidine is prepared in a reaction vessel made of glass. Polymerization is conducted by mean of 3-electrode method using aluminum used for the anode in Example 8 as the operation electrode, platinum as the counter electrode and a saturated calomel electrode (SCE) as the reference electrode and by applying a voltage of 1.2 V vs SCE to make an electric charge amount of 1.0 $c/cm^2$ flowing in the solution. In this case, black oxidized polymer is uniformly deposited on aluminum. When conducting the same peeling test as in Example 8, peeling occurs at one portion.

COMPARATIVE EXAMPLE 11

The same procedures as in Example 10 are conducted except that the aluminum used has a ratio of integrated intensity of diffraction lines by (200) face/integrated intensity of total diffraction lines=0.05. Peeling occurs at six portions.

REFERENCE EXAMPLE 1

Aluminum of 50 μm thickness (ratio of integrated intensity of diffraction lines by (200) face/integrated intensity of total diffraction lines=0.82) is applied with electrolytic etching in an aqueous solution containing 1.5N of hydrochloric acid, 0.3 mol/l of oxalic acid and 0.3 mol/l of aluminum chloride. Tensile test is conducted for the etched aluminum using a test piece of 10×100 mm measured area (the tester is according to JIS 7721). The result is 1.4 kg/cm.

REFERENCE EXAMPLE 2

The same procedures as those in Reference Example 1 are conducted except that the aluminum used (of 50 μm thickness) has a ratio of integrated intensity of diffraction lines by (200) face/integrated intensity of total diffraction lines=0.2. The result is 1.1 kg/cm.

EXAMPLE 11

Electrolytic polymerization is conducted in an electrolyte in which 0.5M aniline and 1.0M $HBF_4$ are dissolved by constant potential electrolysis using the aluminum-polypyrrole electrode prepared in Example 8 as the reaction electrode under 0.7 V vs SCE. Then, the cell performance is evaluated by repeating charge and discharge at 0.2 $mA/cm^2$ in an electrolyte containing 3M $LiBF_4$ dissolved into a mixed solvent of propylene carbonate and dimethoxyethane (7:3) using the resultant composite electrode as the positive electrode and Li as the negative electrode.

| Result | | |
|---|---|---|
| Charge/discharge | 10 times | 30 times |
| Open voltage | 3.7 V | 3.7 V |
| Coulomb efficiency | 100% | 100% |
| Energy density (per active substance) | 432 Wh/kg | 435 Wh/kg |
| Energy density (per positive electrode) | 115 Wh/kg | 116 Wh/kg |
| Short circuit current density | 7.8 mA/cm$^2$ | 7.7 mA/cm$^2$ |

COMPARATIVE EXAMPLE 12

The same procedure as those in Example 11 are conducted except that the aluminum-polypyrrole electrode prepared in Comparative Example 9 is used.

| Result | | |
|---|---|---|
| Charge/discharge | 10 times | 30 times |
| Open voltage | 3.7 V | 3.7 V |
| Coulomb efficiency | 100% | 98% |
| Energy density (per active substance) | 417 Wh/kg | 398 Wh/kg |
| Energy density (per positive electrode) | 111 Wh/kg | 105 Wh/kg |
| Short circuit current density | 5.8 mA/cm$^2$ | 5.2 mA/cm$^2$ |

EXAMPLE 12

Electrolytic etching is applied to aluminum of 60 μm thickness (ratio of integrated intensity of diffraction lines by (200) face/integrated intensity of total diffraction lines=0.94) in an aqueous solution of 5.5N of sulfuric acid and containing 0.15M of aluminum sulfate.

Electrolytic polymerization is conducted in an 5.5N aqueous solution of sulfuric acid containing 0.5M of aniline dissolved therein using the resultant aluminum as the electrolysis electrode and at 0.8 V vs SCE, to obtain the aluminum-polyaniline electrode. In this case, the polyaniline is uniformly polymerized on aluminum and the close bondability is also satisfactory. The aluminum polyaniline electrode is electrochemically active in the electrolyte of the electric cell used in Example 11. Then, the same evaluation is conducted as in Example 11.

| Result | | |
|---|---|---|
| Charge/discharge | 10 times | 30 times |
| Coulomb efficiency | 100% | 100% |
| Energy density (per active substance) | 433 Wh/kg | 437 Wh/kg |
| Energy density (per positive electrode) | 115 Wh/kg | 116 Wh/kg |
| Short circuit current density | 7.8 mA/cm$^2$ | 7.6 mA/cm$^2$ |

COMPARATIVE EXAMPLE 13

An aluminum-polyaniline electrode is obtained in the same manner as in Example 12 except that the aluminum used has a ratio of integrated intensity of diffraction lines by (200) face/integrated intensity of total diffraction lines=0.05. The film thickness of the polyaniline is not uniform, the close bondability is poor and partial film depletion is observed.

Then, the same evaluation is conducted as in Example 11.

| Result | | |
|---|---|---|
| Charge/discharge | 10 times | 30 times |
| Coulomb efficiency | 97% | 100% |
| Energy density (per active substance) | 421 Wh/kg | 349 Wh/kg |
| Energy density (per positive electrode) | 112 Wh/kg | 93 Wh/kg |
| Short circuit current density | 5.6 mA/cm$^2$ | 5.3 mA/cm$^2$ |

EXAMPLE 13

The same cell test is conducted as in Example 3 except that an Li-Al alloy is used as the negative electrode in the cell test.

| Result | | |
|---|---|---|
| Charge/discharge | 10 times | 30 times |
| Open voltage | 3.3 V | 3.3 V |
| Coulomb efficiency | 100% | 100% |
| Energy density (per active substance) | 402 Wh/kg | 403 Wh/kg |
| Energy density (per positive electrode) | 103 Wh/kg | 104 Wh/kg |

EXAMPLE 14

The same cell test is conducted as in Example 12 except that a Li-Al alloy is used as the negative electrode and LiSbF$_6$ as the electrolyte in the cell test.

| Result | | |
|---|---|---|
| Charge/discharge | 10 times | 30 times |
| Open voltage | 3.3 V | 3.3 V |
| Coulomb efficiency | 100% | 100% |
| Energy density (per active substance) | 387 Wh/kg | 389 Wh/kg |
| Energy density (per positive electrode) | 102 Wh/kg | 103 Wh/kg |

What is claimed is:

1. A bonded body of aluminum and electroconductive polymer, said aluminum having a surface to which said polymer is bonded, and mainly having (H00) face (H=1,2,4) as a crystal face at said surface.

2. A method of manufacturing a bonded body of aluminum and electroconductive polymer by means of electrolytic polymerization, comprising depositing electroconductive polymer on a surface of a body of aluminum connected as a reduction electrode, said aluminum mainly having (H00) face (H=1,2,4) as a crystal face at said surface.

3. A method according to claim 2, including the step of applying an etching treatment to said surface prior to depositing said polymer on said surface.

4. A method according to claim 2, wherein said surface is unetched when said polymer is deposited thereon.

5. A method of applying a reduction treatment to electroconductive polymer in a bonded body of aluminum and said polymer, said aluminum having a surface to which said polymer is bonded, and mainly having (H00) face (H=1,2,4) as a crystal face at said surface, said method comprising contacting said polymer in an oxidized state with a reducing medium.

6. A method according to claim 5, wherein said reducing medium is a reducing medium of other than metals.

7. A method according to claim 5, wherein said reducing medium is a reducing metal.

8. A bonded body as defined in claim 1, wherein said polymer is polyaniline or substituted polyaniline.

9. A method of manufacturing a bonded body of aluminum and polyaniline or substituted polyaniline by means of electrolytic polymerization, comprising depositing polyaniline or substituted polyaniline on a surface of a body of aluminum connected as a reaction electrode at an electrolysis potential of from +0.75 to +0.95 V relative to a saturated calomel electrode as a reference electrode in an aqueous acid or mixed acids from 3 to 6N including at least one acid selected from the group consisting of $H_2SO_4$, HCl, and $HBF_4$, said aluminum mainly having (H00) face (H=1,2,4) as a crystal face at said surface.

10. A secondary electric cell comprising an electrode constituted of a bonded body of aluminum and electroconductive polymer, said aluminum having a surface to which said polymer is bonded, and mainly having (H00) face (H=1,2,4) as a crystal face at said surface.

11. A cell as defined in claim 10, further comprising a nonaqueous electrolyte.

12. A cell as defined in claim 10, wherein a positive electrode is said electrode constituted of said bonded body.

13. A cell as defined in claim 12, further comprising a negative electrode which includes Li or Li alloy as an active substance.

* * * * *